United States Patent
Koie et al.

(10) Patent No.: US 9,712,449 B2
(45) Date of Patent: Jul. 18, 2017

(54) PACKET TRANSFER DEVICE AND POWER SUPPLY CONTROL METHOD FOR QOS CONTROL CIRCUIT

(75) Inventors: Naohisa Koie, Yokohama (JP); Teruo Kaganoi, Yokohama (JP); Takeshi Aimoto, Kawasaki (JP)

(73) Assignee: ALAXALA NETWORKS CORPORATION, Kawasaki (JP)

( * ) Notice: Subject to any disclaimer, the term of this patent is extended or adjusted under 35 U.S.C. 154(b) by 952 days.

(21) Appl. No.: 13/397,292

(22) Filed: Feb. 15, 2012

(65) Prior Publication Data

US 2012/0213075 A1 Aug. 23, 2012

(30) Foreign Application Priority Data

Feb. 18, 2011 (JP) ................................. 2011-033154
Nov. 16, 2011 (JP) ................................. 2011-250550

(51) Int. Cl.
| | | |
|---|---|---|
| H04L 12/26 | (2006.01) | |
| H04L 12/54 | (2013.01) | |
| H04L 12/801 | (2013.01) | |
| H04L 12/851 | (2013.01) | |

(52) U.S. Cl.
CPC ................................. H04L 47/2441 (2013.01)

(58) Field of Classification Search
None
See application file for complete search history.

(56) References Cited

U.S. PATENT DOCUMENTS

| | | | | |
|---|---|---|---|---|
| 8,274,908 B2* | 9/2012 | Hsin | ...................... | H04W 28/24 370/230 |
| 2002/0136228 A1 | 9/2002 | Miyamoto | | |
| 2007/0280239 A1 | 12/2007 | Lund | | |
| 2009/0228723 A1* | 9/2009 | Yoshizaki | ............... | H04L 12/10 713/300 |
| 2010/0131781 A1* | 5/2010 | Memon et al. | ................ | 713/310 |
| 2011/0058564 A1* | 3/2011 | Sugawara | ............... | H04L 49/10 370/401 |

(Continued)

FOREIGN PATENT DOCUMENTS

| | | |
|---|---|---|
| EP | 2 259 509 A1 | 12/2010 |
| JP | 2001-345861 | 12/2001 |

(Continued)

OTHER PUBLICATIONS

Japan Patent Office Notification of Reasons for Refusal on application 2011-250550 mailed Jun. 3, 2014; 3 pages.

(Continued)

*Primary Examiner* — Hassan Phillips
*Assistant Examiner* — Duc Duong
(74) *Attorney, Agent, or Firm* — Foley & Lardner LLP

(57) ABSTRACT

It is intended to reduce a power consumption without degrading a communication quality of a packet transfer device. One or more of a receiver, a switch unit, and a transmitter include a QoS control circuit for applying QoS control to received packets. There is provided a power saving operation mode that enables power saving operation by changing a grain size of the QoS control according to a flow rate of the packets, and controlling whether or not to supply an electric power to the QoS control circuit or a part of the QoS control circuit, according to the flow rate of the packets.

13 Claims, 13 Drawing Sheets

(56) References Cited

U.S. PATENT DOCUMENTS

2012/0063353 A1* 3/2012 Schlenk .................. H04L 12/12
370/253

FOREIGN PATENT DOCUMENTS

| JP | 2002-281066 | 9/2002 |
| JP | 2003-283552 | 10/2003 |
| JP | 2010-1579013 A | 7/2010 |
| JP | 2011-029788 | 2/2011 |

OTHER PUBLICATIONS

European Patent Office extended search report on application 12155714.4 mailed Jun. 12, 2012; 8 pages.

\* cited by examiner

PACKET FLOW OF BANDWIDTH CONTROL CIRCUIT
INPUT PACKET OF BANDWIDTH CONTROL CIRCUIT
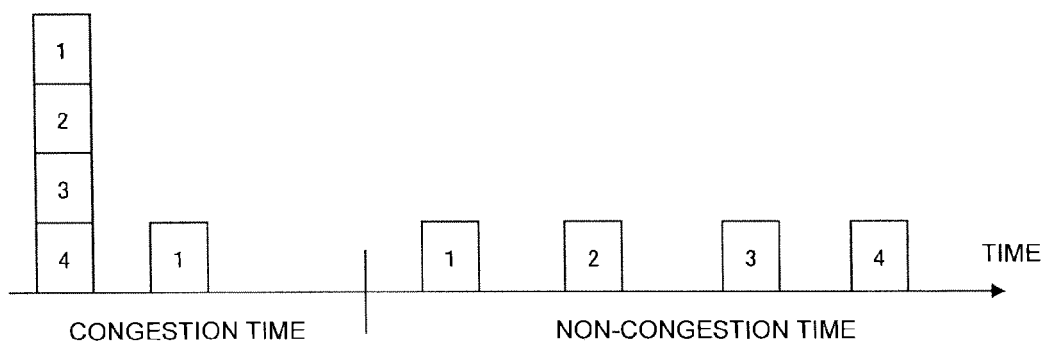
OUTPUT OF BANDWIDTH CONTROL CIRCUIT
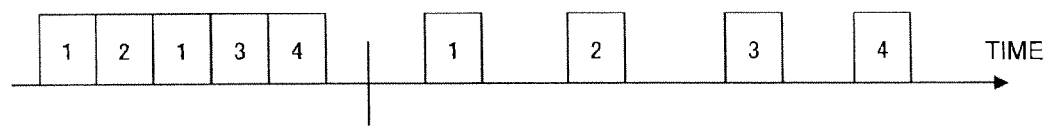
FIG.3

EXAMPLE OF SETTING CHANGE IN THE NUMBER OF QUEUES

```
Current Schedule Status : enable                                    //SCHEDULER OPERATION ENABLE
2010/09/21(Tue) 18:00 - 2010/09/21(Tue) 20:00 que_num 8             //DESIGNATE SPECIFIC DATE/TIME ZONE
                                                                      AND THE NUMBER OF QUEUES

****/**/**(***) 21:00 - ****/**/**(***)  9:00 que_num 1             //DESIGNATE SPECIFIC TIME ZONE
****/**/**(***)  9:00 - ****/**/**(***) 18:00 que_num 8               AND THE NUMBER OF QUEUES
****/**/**(***) 18:00 - ****/**/**(***) 20:00 que_num 4               ON DAILY BASIS

****/**/**(Sun) **:** - ****/**/**(Sun) **:** que_num 1             // DESIGNATE SPECIFIC DAY ON WEEK
                                                                       AND THE NUMBER OF QUEUES

// TIME ZONE NOT DESIGNATED IS LARGEST IN THE NUMBER OF QUEUES
```

FIG.10

SETTING EXAMPLE OF CONTROLLING THE NUMBER OF
QUEUES ACCORDING TO LOAD

| //QoS queue select | //SELECT QUEUE |
| --- | --- |
| | TO BE USED ACCORDING TO LOAD |
| Target Queue :linecard 1 out | //DESIGNATE TARGET QOS CIRCUIT |
| 0 to 20 p :qos-assign 8 8 8 8 8 8 8 8 other-queue-off | //WHEN LOAD IS 0 TO 20% |
| 20 to 30 p :qos-assign 4 4 4 4 8 8 8 8 other-queue-off | //WHEN LOAD IS 20 TO 30% |
| 30 to 40 p :qos-assign 2 2 4 4 6 6 8 8 other-queue-off | //WHEN LOAD IS 30 TO 40% |
| 40 to 50 p :qos-assign 2 2 4 4 6 6 8 8 | //WHEN LOAD IS 40 TO 50% |
| Default :qos-assign 1 2 3 4 5 6 7 8 | |
| //REFLECT SETTING OF DEFAULT IN CASE OF UNDESIGNATED LOAD | |

FIG.12

SETTING EXAMPLE OF CONTROLLING THE NUMBER OF
QUEUES USING SCHEDULER

```
//QoS queue select                                    //SELECT QUEUE
                                                        TO BE USED ACCORDING TO LOAD
Target Queue :linecard 1 out                          //DESIGNATE TARGET QOS CIRCUIT //DESIGNATE SPECIFIC DATE/TIME ZONE AND THE NUMBER OF QUEUES
2010/09/21(Tue) 18:00 - 2010/09/21(Tue) : 20:00 qos-assign 2 2 4 4 6 6 8 8 other-queue-off //DESIGNATE SPECIFIC TIME ZONE AND THE NUMBER OF QUEUES ON DAILY BASIS
**//(*) 21:00 - **//(*) :  9:00 qos-assign 8 8 8 8 8 8 8 8 other-queue-off
****/**/**(***)  9:00 - ****/**/**(***) : 18:00 qos-assign 1 2 3 4 5 6 7 8
**//(*) 18:00 - **//(*) : 20:00 qos-assign 2 2 4 4 6 6 8 8 other-queue-off //DESIGNATE SPECIFIC DAY ON WEEK AND THE NUMBER OF QUEUES
**//(Sun) : - //(Sun) : :** qos-assign 8 8 8 8 8 8 8 8 other-queue-off //REFLECT SETTING OF DEFAULT IN CASE OF UNDESIGNATED LOAD
Default    :qos-assign 1 2 3 4 5 6 7 8
```

FIG.13

PACKET TRANSFER DEVICE AND POWER SUPPLY CONTROL METHOD FOR QOS CONTROL CIRCUIT

CLAIM OF PRIORITY

The present application claims priority from Japanese patent applications JP 2011-033154 filed on Feb. 18, 2011 and JP 2011-250550 filed on Nov. 16, 2011, the contents of which are hereby incorporated by reference into this application.

BACKGROUND OF THE INVENTION

1. Technical Field

The present invention relates to a packet transfer device and a power supply control method for a quality of service (QoS) control circuit, and more particularly to a packet transfer device that realizes a QoS control function used in a communication device such as a router or a switch and an energy saving control system thereof, and a power supply control method for the QoS control circuit.

2. Related Art

Packet transfer devices such as a router or a switch currently used in packet communication have a large number of functions. Among those functions, a QoS control function (scheduling function, policer function, buffering function, etc.) is implemented by hardware with high percentage. A QoS control is a technique for designating and controlling transfer characteristics (delay priority or loss priority) according to identification information on a packet to be transferred (for example, identifiers of a destination or source address, or an upper layer protocol, identifiers of VPN No. or VLAN, etc.). Among those QoS control, the scheduling function (or shaping function) is provided at an output port from a device to a line, and most effective as a technique making some distinction in the transfer characteristics.

A variety of systems have been known for the scheduling function. For example, there is "priority queuing system (hereinafter referred to as "PQ system"). In the PQ system, plural queues are provided for the respective priorities, and each packet is loaded into a queue corresponding to the delay priority of the packet. The loaded packets are extracted from the queues in a descending order of the priority by the scheduler and transferred. The packets loaded into the queues lower in the priority are transferred after all of the packets loaded into the queues higher in priority have been transferred. As a result, it is ensured that the packets loaded into the queues higher in the priority are transferred with a smaller delay time than that of the packets loaded into the queues lower in the priority. With this effect, for example, it can be ensured that a delay time value of voice packets is suppressed to a given time or shorter. Also, as another scheduling system, there is "weighted fair queuing system (hereinafter referred to as "WFQ system"). The WFQ system controls bandwidth values which are transferred from plural queues on the basis of predetermined weight values. Even when the packets of the queues higher in the priority are continuous, the WFQ system is effective to a case in which transfer of the packets of the queues lower in the priority is ensured according to the weight value of the WFQ, and a given service level is to be ensured for each application. Up to now, plural other scheduling systems, and systems combining those systems together have been proposed.

In this way, the scheduling function is realized by the function of classifying and accumulating the packets into the plural queues according to the identification information of the packets, and the function of extracting the packets from the plural queues according to a specific algorithm. Those scheduling functions are selectively used according to a status of the packets (traffic) to be transferred on a network, or the type of service to be provided.

On the other hand, JP-A-2001-345861 discloses a technique by which the packets input from a local area network are monitored to dynamically change (decrease) the number of queues upon sensing an increase in the traffic, thereby preventing an excessive traffic from flowing. The queues are decreased to intentionally discard the packets.

Also, JP-A-2003-283552 (reference numerals in this paragraph are disclosed in JP-A-2003-283552) discloses the provision of a monitor unit 11 that periodically and automatically acquires traffic information for specifying characteristics of an input traffic in a QoS control router 2 at given time intervals. JP-A-2003-283552 also discloses the provision of a QoS control system selector 12 that selects an optimum QoS control system in the QoS control router 2, on the basis of a traffic volume specified from the traffic information acquired from the monitor unit 11, and externally controls a router setting device 4 so that a required QoS control based on the QoS control system for this selection is executed in the corresponding QoS control router 2.

Also, JP-A-2002-281066 discloses a queue assignment system and a queue assignment method for a packet switch, and more particularly a queue assignment system and a queue assignment method for a packet switch, which reduce the degradation of a transmission quality attributable to the concentration of traffic on one queue.

SUMMARY OF THE INVENTION

The packet transfer device such as the router or the switch is growing in performance and function, and an electric energy required by the device is ever increasing in proportion to the growth of the performance and function. On the other hand, a moment at which the packet transfer device needs a full (100%) performance and function loaded therein is limited. That is, the packet transfer device does not always receive the packets to a performance limit, and does not always need all circuits. Nevertheless, to unnecessarily operate all the circuits providing the maximum performance and the full function is useless and problematic from a viewpoint of an effective consumption of the electric power.

On the other hand, the QoS function is implemented by hardware with high percentage, and provides an important technique for making some distinction in the transfer characteristics (delay priority or loss priority) according to the type of packet to be transferred (for example, types of a destination or source address, or an upper layer protocol). Therefore, there is a need for the QoS function to seem to always function from the outside of the device, regardless of the traffic volume (packet load to be transferred) to be transferred by the packet transfer device.

The present invention aims at reducing a power consumption without degrading a communication quality of the packet transfer device by activating or deactivating the QoS control according to a state of traffic (load).

JP-A-2001-345861 discloses a technique by which when a congestion state is detected, a queue length configuring an FIFO is shortened to positively discard the packets, and with this effect, a network is recovered from the congestion state. This technique changes the queue length to be shortened when detecting a state in which the traffic is heavy, but does not turn off the QoS function per se when detecting a state where the traffic is light.

JP-A-2003-283552 aims at providing an IP packet network QoS control system selecting method and a device which can automatically select an optimum QoS control system for each QoS control router. However, there is no disclosure of an object, means, and effect for saving energy by deactivating the QoS control function per se.

JP-A-2002-281066 discloses a queue assignment system and a queue assignment method for a packet switch, and more particularly to a queue assignment system and a queue assignment method for a packet switch, which reduce the degradation of a transmission quality attributable to the concentration of traffic on one queue. However, there is no disclosure of an object, means, and effect for saving energy by deactivating the QoS control function per se.

In the packet transfer device such as the router or the switch, a scheduling control operates logic circuits such as a memory circuit configuring the queues used for the scheduling control and a control circuit for distributing the packets to the respective queues according to the amount of packets (load) every time the packets are received or transmitted, and the electric power is consumed. However, when the traffic volume is light (for example, line bandwidth or lower), there is no state in which the packets are accumulated into the queues, and it waits for output of the packets, and the packets are output as it is in an order input to a scheduling control processor. That is, the packet transfer device seems to conduct the same processing from the outside of the device regardless of whether a PQ control functions, or not (refer to non-congestion time in FIG. 3 to be described later).

In view of the above, one object of the present invention is to reduce an unnecessary electric power consumed by QoS operation without changing (degrading) a QoS function of a packet transfer device when being viewed from the outside by activating (deactivating an unnecessary portion) a circuit of a QoS control function such as a router or a switch according to a traffic volume.

Another object of the present invention is to provide a function of determining a necessary level when there is a need to activate a circuit for providing a function due to an increase in the traffic volume, and activating the circuit. Still another object of the present invention is to reduce an unnecessary electric power consumed by QoS operation by activating (deactivating an unnecessary portion) a circuit having a QoS control function such as a router or a switch with a minimum limit according to the traffic volume, and allowing the quality of the QoS function of the packet transfer device when being viewed from the outside to be changed (degraded) within a given limit.

According to the present invention, a power saving operation mode is provided in a QoS control circuit (a bandwidth control circuit, a bandwidth monitor circuit, a buffer and switch circuit) within the packet transfer device (means 1). In the power saving operation mode, for example, in the bandwidth control circuit, a change in an operation state such that the number of active queues (range) is limited is instructed.

Also, in the present invention, a flow rate monitor circuit and a determination circuit are provided within the QoS control circuit (means 2). The flow rate monitor circuit monitors a flow rate of packets to be processed in the QoS control circuit. The determination circuit determines whether the QoS control circuit operates in the power saving operation mode, or not, and instructs the operation mode according to a flow of FIG. 4.

Further, in the present invention, there is provided a power supply range control unit that limits a power supply to an operating range within the QoS control circuit (means 3).

Further, in the present invention, there is provided an interface that holds determination information for determining whether the packet transfer device should operate in the power saving operation mode, or not, in the device, and sets the determination information from the external (means 4).

According to the first solving means of this invention, there is provided a packet transfer device comprising:
a receiver that receives packets;
a transmitter that transmits the packets; and
a switch unit that transfers the packets received by the receiver to the transmitter, wherein
one or more of the receiver, the switch unit, and the transmitter include a QoS control circuit for applying QoS control to received packets, and
there is provided a power saving operation mode that enables power saving operation by changing a grain size of the QoS control according to a flow rate of the packets, and controlling whether or not to supply an electric power to the QoS control circuit or a part of the QoS control circuit, according to the flow rate of the packets.

According to the second solving means of this invention, there is provided a power supply control method for QoS control circuit, comprising:
monitoring a flow rate of packets to be input to the QoS control circuit within a packet transfer device, and transmitting information on the flow rate to a determination circuit outside the packet transfer device;
transmitting determination information, which has been determined in the determination circuit whether or not to change over the QoS control circuit to a power saving operation mode according to the information on the flow rate, to the QoS control circuit within the packet transfer device; and
changing a grain size of a QoS control according to the determination information, and controlling whether or not to supply the power to the QoS control circuit or a part of the QoS control circuit according to the determination information in the packet transfer device.

According to the present invention, the circuit having the QoS control function such as the router or the switch has an advantage that an unnecessary electric power consumed by QoS operation is reduced without changing (degrading) the QoS function of the packet transfer device when being viewed from the outside by activating (deactivating an unnecessary portion) the circuit having the QoS control function such as the router or the switch according to the traffic volume.

According to the present invention, it is possible to provide a function of determining a necessary level when there is a need to activate a circuit for providing a function due to an increase in the traffic volume, and activating the circuit. According to the present invention, it is possible to reduce an unnecessary electric power consumed by QoS operation by activating (deactivating an unnecessary portion) a circuit having a QoS control function such as a router or a switch with a minimum limit according to the traffic volume, and allowing the quality of the QoS function of the packet transfer device when being viewed from the outside to be changed (degraded) within a given limit.

BRIEF DESCRIPTION OF THE DRAWINGS

FIG. 3 is a diagram illustrating a packet flow of a bandwidth control circuit;

FIG. 10 is a diagram illustrating an example of setting a change in the number of queues;

FIG. 12 is a diagram illustrating an example of setting a queue number control according to a load; and FIG. 13 is a diagram illustrating an example of setting a queue number control using a scheduler.

DETAILED DESCRIPTION OF THE PREFERRED EMBODIMENTS

First Embodiment

A first embodiment according to the present invention will be described with reference to FIGS. 1, 2, 3, 4, 6, 11, and 12. In the first embodiment, a dynamic power saving control of a QoS control circuit is conducted by using a flow rate monitor circuit.

Figure 2:
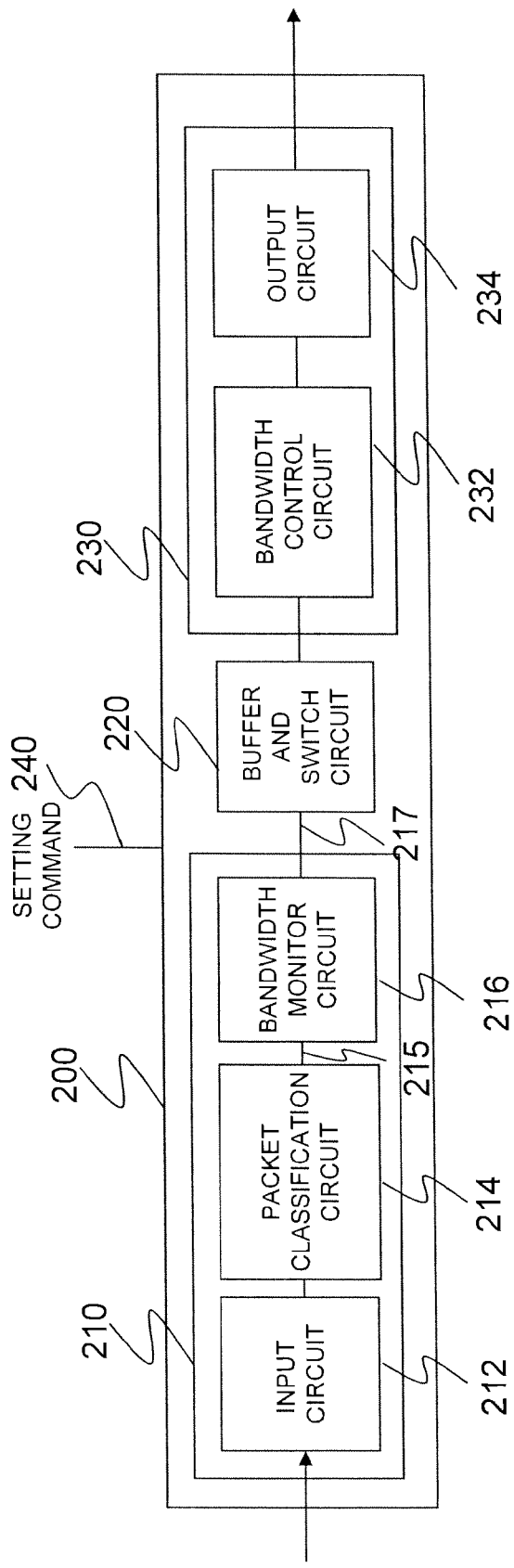
FIG. 2 is a diagram illustrating a configuration of a packet transfer device.

FIG. 2 is a block diagram of a packet transfer device 200. The packet transfer device 200 controls processing of QoS control, for example, according to Diffsery (RFC2474, etc.) which is a standard specification of IETF, or a QoS specification of IEEE (IEEE 802.1p, etc.) The packet transfer device 200 includes a receiver 210, a buffer and switch circuit (switch unit) 220, and a transmitter 230. The receiver 210 includes an input circuit 212, a packet classification circuit 214, and a bandwidth monitor circuit 216. The transmitter 230 includes a bandwidth control circuit 232 and an output circuit 234. The plural receivers 210 and the plural transmitters 230 may be provided, and packets may be exchanged by the buffer and switch circuit 220.

A packet that has been received by the packet transfer device 200 is subjected to processing of photoelectric conversion or error detection and correction by the input circuit 212, and then output to the packet classification circuit 214. The packet classification circuit 214 checks a received packet header according to a predetermined classification condition (for example, transfer a video packet received from a specific source address in a high priority transfer), and adds control information for QoS processing to the packet. The bandwidth monitor circuit 216 that has received the packet monitors a flow of the received packet (for example, determines whether the packet satisfies a predetermined limit bandwidth, or not, and implements a discarding process if the packet does not comply with the limit bandwidth). The monitoring process of the bandwidth monitor circuit 216 is a part of the QoS processing, and is subjected to power saving control in this embodiment.

The packet that has passed through the bandwidth monitor circuit 216 is transferred to the buffer and switch circuit 220. The buffer and switch circuit 220 conducts a process of exchanging the packet for an output line of the packet. If the transmitter 230 corresponding to the output line is congested with the packets, the packets are accumulated in the buffer, and transferred to the transmitter 230, for example, according to the priority of the control information added by the packet classification circuit 214. A process of transferring the packets according to the priority in the buffer and switch circuit 220 is also a part of the QoS control, and is subjected to the power saving control.

The packet transferred to the transmitter 230 is output to the output line from the output circuit 234 through the bandwidth control circuit 232. When the bandwidth control circuit 232 receives the packets exceeding a bandwidth of the output line, the bandwidth control circuit 232 executes a process of accumulating the packets in the buffer, and outputting the packets according to the priority. The control process of the bandwidth control circuit 232 is also a part of the QoS processing, and is subjected to the power saving control.

Figure 1:
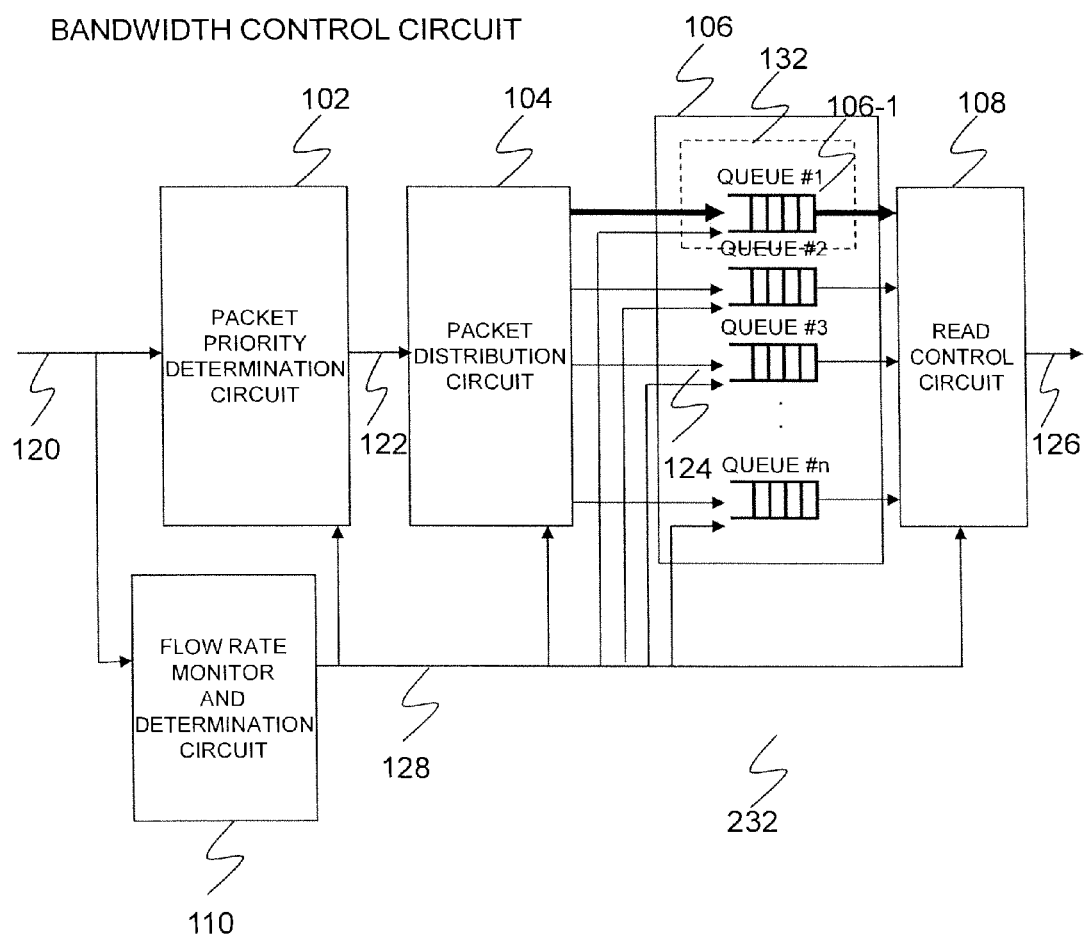
FIG. 1 is a diagram illustrating a configuration of a power saving bandwidth control circuit.

Subsequently, a power saving QoS process of the bandwidth control circuit 232 will be described with reference to FIG. 1. The bandwidth control circuit 232 includes a packet priority determination circuit 102, a packet distribution circuit 104, a queue 106, a read control circuit 108, and a flow rate monitor and determination circuit (controller) 110. The queue 106 has plural queues 106 (queues #1 to #n), and enables on/off of power supply for each queue. The packet priority determination circuit 102 discriminates a transfer priority of the packets on the basis of the control information added by the packet classification circuit 214, and sends the transfer priority to the packet distribution circuit 104. The packet distribution circuit 104 that has received the transfer priority transmits the packet to one corresponding queue (queue No. such as the priority corresponding to an instruction of the control information, 106-1, for example) of the queue 106, and stores the packet in that queue. The read control circuit 108 reads the packet from the queue 106 on the basis of the control information such as a predetermined priority or bandwidth value, and outputs the packet toward an output line 126.

Figure 8:
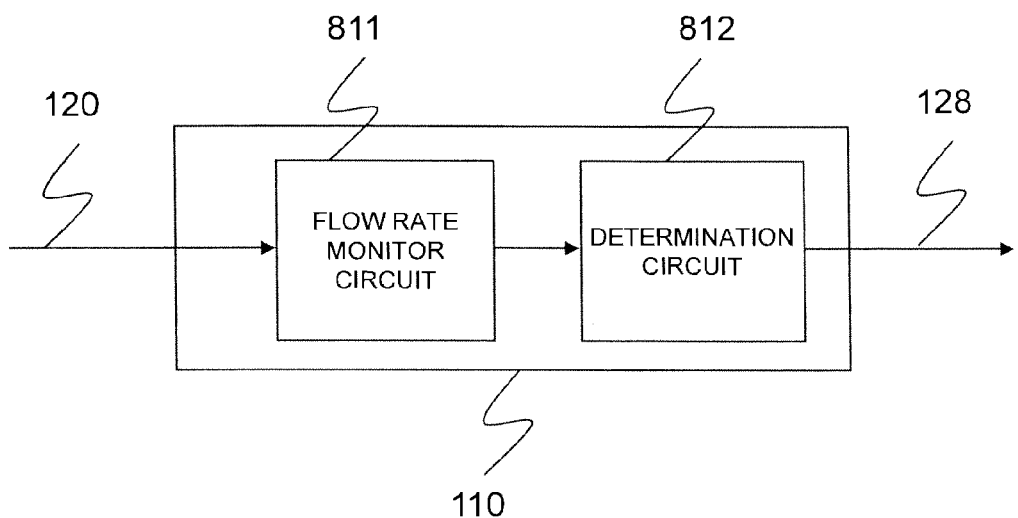
FIG. 8 is a diagram illustrating a configuration of a controller including a flow rate monitor circuit and a determination circuit.

Subsequently, the flow rate monitor and determination circuit 110 will be described with reference to FIGS. 1 and 8. The flow rate monitor and determination circuit 110 monitors a flow rate of packets (for example, the amount of packets per unit time) transferred from the buffer and switch circuit 220 through an internal signal line 120 by a flow rate monitor circuit 811, and determines a changeover to a power saving operation mode (or return to an normal operation mode) by a determination circuit 812 (details will be described with reference to FIG. 4). For example, the determination circuit 812 compares a monitor result of the flow rate monitor circuit 811 with a predetermined threshold value to determine whether to change over the operation mode to the power saving operation mode, or not. When the flow rate monitor and determination circuit 110 determines the changeover to the power saving operation mode, an instruction for the changeover is transmitted to the packet priority determination circuit 102, the packet distribution circuit 104, the queue 106, and the read control circuit 108 through a control signal line 128 to start operation in the power saving operation mode. The power saving operation mode will be described in detail later. Hereinafter, a case in which the active queue 106 is limited to a range (queue #1) of a dotted line 132 will be described. In this case, after changing over to the power saving operation mode, the packet priority determination circuit 102 and the packet distribution circuit 104 in the bandwidth control circuit 232 distribute and output the packets to the queue within the dotted line 132 of the queue 106. That is, the packets to be distributed to the queue #2 to the queue #n are merged into the queue #1, and output. Accordingly, the packets are not accumulated in the queue #2 to the queue #n. From a viewpoint of QoS grain size, in a normal mode, the packets are distributed into the queues #1 to #n, and read on the basis of the priority or the bandwidth value by the read control circuit 108. On the contrary, in the power saving operation mode, the packets are output to the queue #1 regardless of the priority, and read by an FIFO, and therefore the QoS gain size becomes coarse. The flow rate monitor conducted by the flow rate monitor and determination circuit 110 may monitor a flow rate of the internal signal line 120, or may monitor accumulation in the queue 106 per unit time.

Figure 11:
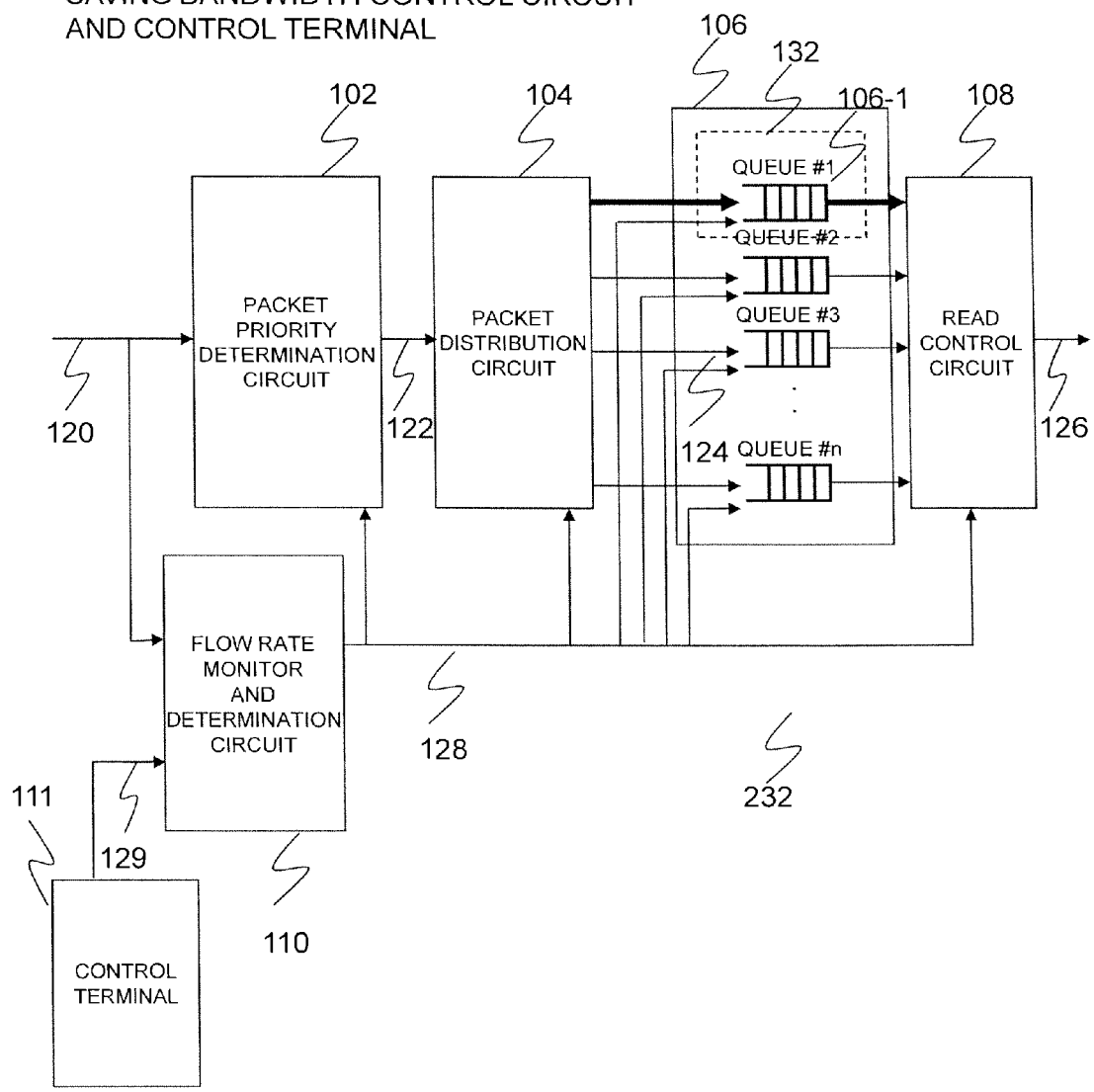
FIG. 11 is a diagram illustrating a configuration of the power saving bandwidth control circuit and a control terminal.

Also, the flow rate monitor and determination circuit 110 can receive setting information (for example, the above-mentioned threshold value of the packet flow rate, and a load state and assignment of the queues which will be describe later) that specifies the operation of the power saving operation mode from a control terminal (external device) 111 in FIG. 11 through a control line 129, and hold the setting information. The flow rate monitor and determination circuit 110 transmits a changeover instruction for the power saving operation mode and the operation to be conducted in each mode to the packet priority determination circuit 102, the packet distribution circuit 104, the queue 106, and the read control circuit 108 through the control signal line 128 with the use of the monitored flow rate of the packets and the held setting information.

The power feeding of the queue 106 is divided into, for example, a first range (queue #1) of the dotted line 132, and a second range other than the first range. After changing over to the operation mode, a control for stopping the power feeding to the second range (queue #2 to queue #n) in which the packets are not accumulated is conducted by the flow rate monitor and determination circuit 110. For example, the flow rate monitor and determination circuit 110 may include a power supply range control unit that limits a power supply to an operating range within the QoS control circuit. With this configuration, no power is supplied to the queue 106 in a non-active range to obtain a power saving effect. The division of a power feeding range (range to be subjected to the power saving operation mode) may be conducted at any portion of the queue 106. The queues in a specific range between the queue #1 and the queue #n may be divided. In this way, the queue #1 to the queue #n can be activated or deactivated by controlling the respective power supply and stop. Also, instead of rendering only one queue (for example, queue #1) active, the packets are buffered by an internal register to supply no power to the queue 106, as a result of which the power saving effect is further enhanced. When only one queue (for example, #1) is rendered active among the queue 106, power supply of the packet priority determination circuit 102, the packet distribution circuit 104, the queues 106 other than the queue #1, and the read control circuit 108 (for example, circuit that selects and reads the queue) may turn off. In this case, for example, the received packets are stored directly in the queue #1, and sequentially read and output. Further, as an installation mode, this may be installed into plural package cards or LSI within the device, or may be installed within the LSI.

In this example, turning off the power supply of the packet priority determination circuit means that the packets are transferred to the downstream packet distribution circuit without determining the priority, and the circuit for determining the priority is deactivated.

Figure 6:
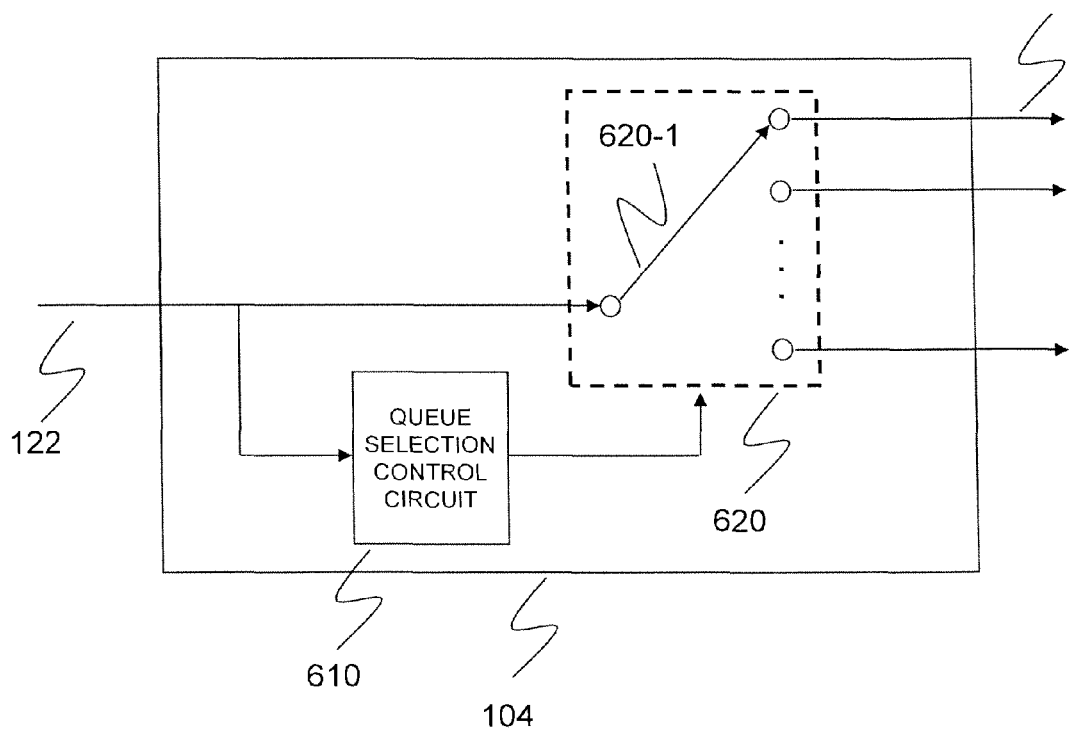
FIG. 6 is a diagram illustrating a configuration of a packet distribution circuit of the bandwidth control circuit.

Also, the operation of turning off the power supply for the packet distribution circuit will be described with reference to FIG. 6. The packet distribution circuit 104 includes a selector 620 that switches a distribution destination of the packets to any one of the plural queues according to an input instruction, and a queue selection control circuit 610 that indicates the distribution destination of the packets to the selector 620. The packet distribution circuit 104 receives the packets and priority information from the packet priority determination circuit 102 through an input circuit 122. The priority information is transmitted to the queue selection control circuit 610, and the queue selection control circuit 610 controls the selector 620 in the normal mode, and distributes the packets to the respective queues. Turning off the power supply of the packet distribution circuit 104 can be realized by, for example, fixing a connection destination of the selector 620 (in FIG. 6, fixed to a connection 620-1 connected to the queue #1 assuming a case in which only the queue #1 is rendered active), and rendering a switching function of the queue selection control circuit 610 and the selector 620 inactive.

Subsequently, a state in which the operation mode can change over to the power saving operation mode will be described with reference to FIG. 3. FIG. 3 illustrates a state of input packets to the bandwidth control circuit 232 in an upper stage, and a state of output packets from the bandwidth control circuit 232 in a lower stage. Also, a left half along a time axis illustrates a congestion state, and a right half illustrates a non-congestion state. In this example, a bandwidth of the output line 126 can transmit one packet for each time unit. The input packets to the bandwidth control circuit 232 are internally transferred for absorbing burst traffic from plural input lines, and normally designed to enable a bandwidth equal to or larger than the bandwidth of the output line 126 to be transferred. A numerical value within a square indicative of each packet represents the packet transfer priority.

In the congestion state of FIG. 3, as the input packets to the bandwidth control circuit 232, four packets with the respective priorities 1, 2, 3, and 4 are input thereto at the same time, and then after a time for one packet is spared, one packet with the priority 1 is input. The four packets first input are accumulated in the queue 106 according to the priority, and read. In a status of the output, the packets are read in the stated order of the priorities 1 and 2. Because the packet with the priority 1 is input during reading, the packet with the priority 1 is output before outputting the packets with the priorities 3 and 4. In the non-congestion state of FIG. 3, as the input packets to the bandwidth control circuit 232, four packets with the priorities 1, 2, 3, and 4 are input at the respective intervals of one packet transfer time. In a status of the output, the four packets with the priorities 1, 2, 3, and 4 are sequentially read.

In the non-congestion state (for example, a state of setting the power saving operation mode in which only the queue #1 (106-1) is rendered active, and the other queues are rendered non-active among the queues 106), the operation when the packet transfer device 200 is viewed from the external completely matches the normal operation, and the power saving effect is obtained. FIG. 3 illustrates two states of the congestion time and the non-congestion time. However, there are conceivable various modified examples such that plural congestion states (weak congestion state, etc.) are defined, a quality level permissible by a manager is defined, and the number of active queues is appropriately set. For example, the above-mentioned power saving operation mode may have plural modes. Those examples are also included in the embodiment of the present invention.

Likewise, the buffer and switch circuit 220 is also provided with functions corresponding to the bandwidth control circuit 232, and effective in implementing the power saving operation mode of this embodiment. More specifically, the buffer and switch circuit 220 has the functions corresponding to the packet priority determination circuit 102, the packet distribution circuit 104, the queue 106, the read control circuit 108, and the flow rate monitor and determination circuit 110 within the bandwidth control circuit 232.

Figure 7:
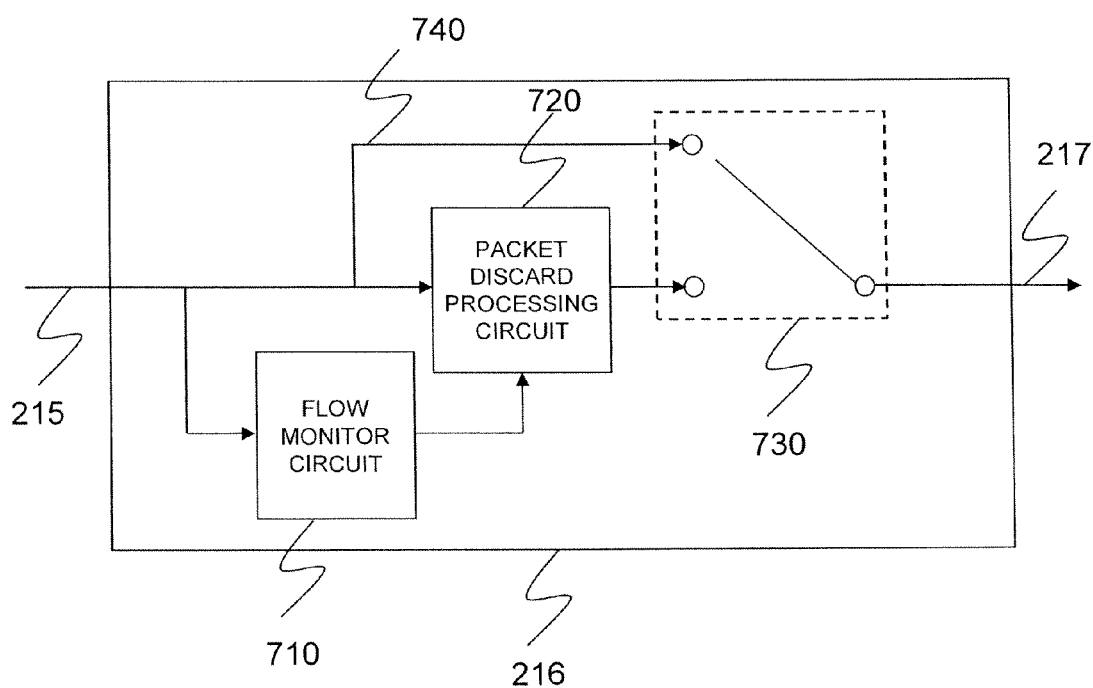
FIG. 7 is a diagram illustrating a configuration of a bandwidth monitor circuit.

Further, the QoS function (bandwidth monitor function) implemented by the bandwidth monitor circuit 216 is effective in implementing the power saving operation mode of the present invention in a state where the flow rate is sufficiently small as compared with a monitor bandwidth. As illustrated in FIG. 7, the bandwidth monitor circuit 216 includes, for example, a flow monitor circuit 710, a packet discard processing circuit 720, and a selector 730. In this example, the selector 730 is set to allow passage of a route 740 bypassing the processing so that the power supply to the flow monitor circuit 710 and the packet discard processing circuit 720 can turn off. As a result, power saving can be realized. The flow monitor circuit 710 may monitor the flow rate of the packet, and output the setting instruction to the selector 730.

Figure 4:
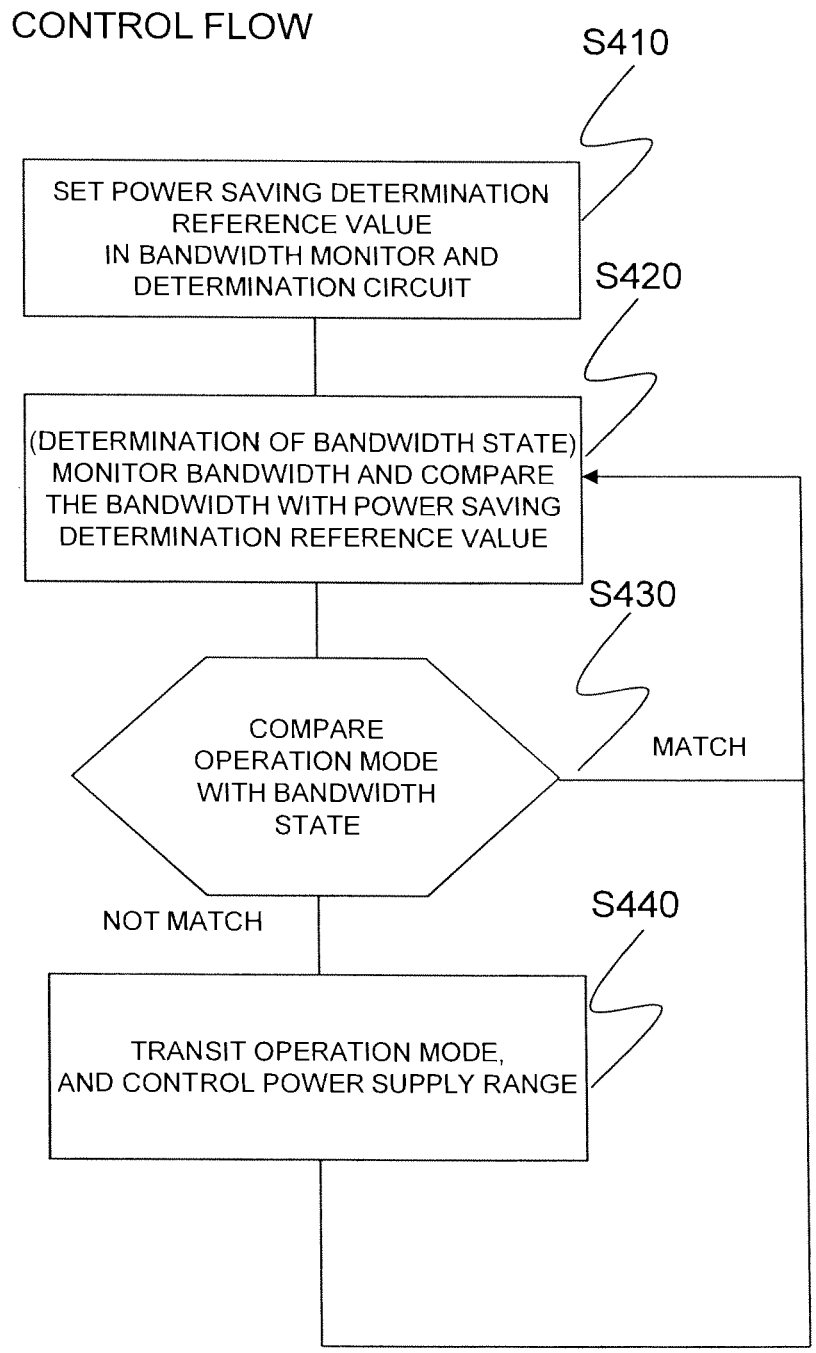
FIG. 4 is a flowchart illustrating a control flow.

A control flow of the flow rate monitor and determination circuit 110 is illustrated in FIG. 4. First, a power saving determination criterion (determination information) indicative of a determination condition of the power saving operation mode or a power saving range is set in the flow rate monitor and determination circuit 110 through a setting command 240 (Step 410). The packet transfer device can further include an interface for setting the determination information by the external device. Subsequently, the flow rate monitor and determination circuit 110 monitors a bandwidth state, and compares the bandwidth state with the power saving determination criterion (Step 420). As a result of comparison, a mode corresponding to the bandwidth state is found. Then, the present operation mode is compared with the mode corresponding to the bandwidth state determined in Step 420 (Step 430). If the present operation mode matches the determined mode, the flow returns to Step 420. If the present operation mode does not match the determined mode, it is determined that the operation mode is transited, and an instruction is issued through the signal line 128.

In the above description, the transition to the power saving operation mode is particularly exemplified. The same is applied to the transition from the power saving operation mode to the normal mode.

Figure 5:
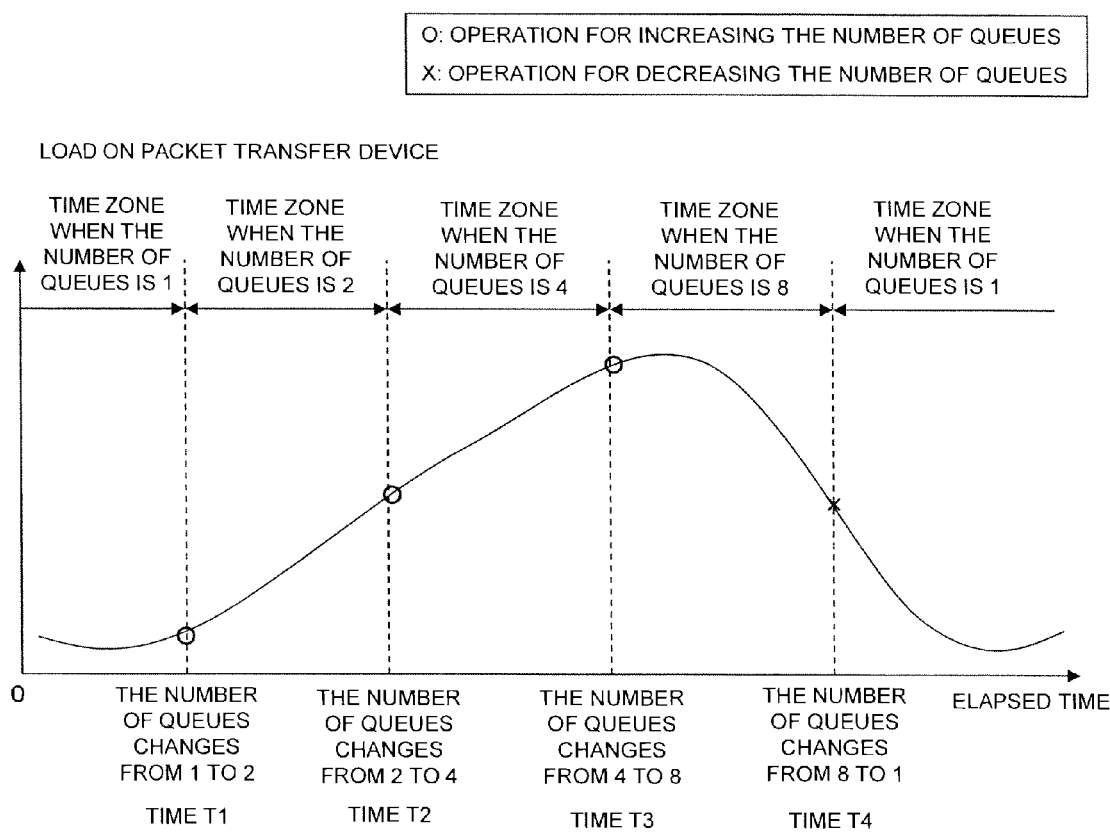
FIG. 5 is a diagram illustrating an example of a change in a load and the number of queues.

FIG. 5 illustrates a control example of a load state (state of an input bandwidth) detected by the flow rate monitor and determination circuit 110 and the number of active queues corresponding to the load state. The load state is low till a time T1, and the operation mode in a state where the number of active queues is 1 is instructed. It is detected that the load state is increased at the time T1 (for example, larger than a predetermined threshold value), and changeover to the operation mode in which the number of active queues is 2 is instructed. It is detected that the load state is further increased at a time T2, and changeover to the operation mode in which the number of active queues is 4 is instructed. Then, changeover to the operation mode in which the number of active queues is 8 is instructed at a time T3. It is detected that the load state is rapidly reduced at a time T4, and changeover to the operation mode in which the number of active queues is 1 is instructed. A threshold value of the load state (for example, bandwidth) for changing over the mode can be set among the respective modes in advance. The threshold value for increasing the number of queues and the threshold value for decreasing the number of queues may be the same value or different values.

A specific example in which the maximum number of queues is 8 will be described. When the active queue is #1 till the time T1, and the queue #5 also becomes active after the time T1, the packets to be distributed to the queues #1 to #4 are distributed to the queue #1, and the packets to be distributed to the queues #5 to #8 are distributed to the queue #5 by the packet distribution circuit 104. Also, when the queue #3 and the queue #7 become further active after the time T2, the packets to be distributed to the queues #1 and #2 are distributed to the queue #1, the packets to be distributed to the queues #3 and #4 are distributed to the queue #3, the packets to be distributed to the queues #5 and #6 are distributed to the queue #5, and the packets to be distributed to the queues #7 and #8 are distributed to the queue #7 by the packet distribution circuit 104. In this way, the packets to be distributed to the non-active queues are distributed to a queue lowest in the priority of active queues higher in priority than the non-active queues.

An example of setting the load state and the queue assignment when the maximum number of queues is 8 will be described with reference to FIG. 12. In the setting, there is a need to designate a target QoS circuit because plural QoS circuits exist within the packet transfer device. Eight figures are aligned in the order of No. of a queue in which the packets with the priority 1 are loaded, and No. of a queue in which the packets with the priority 2 are loaded so as to deal with everything to the priority 8. Finally, it is designated whether the power supply to unused queues is to be stopped, or not. There is a need to set the assignment of the queues to the respective priorities and the stop of the power supply for each load state monitored by the flow rate monitor and determination circuit 110. In FIG. 12, the power saving operation mode is specified according to each load in the overall bandwidth. In a first recitation, the operation mode is set in a case where, the load arranges from 0% to 20%, and all of the priorities are assigned to the queue #8, and the power supply to the unused queues #1 to #7 stops. A second recitation shows a case where the load is from 20% to 30%, a third recitation shows a case where the load is from 30% to 40%, a fourth recitation shows a case where the load is from 40% to 50%, and a final recitation shows setting of a default applied in a load other than the above loads. In FIG. 12, each load state is designated by a rate to the overall bandwidth. Alternatively, the load state may be expressed by an absolute value of the load state. As described above, such setting information can be set in the flow rate monitor and determination circuit 110, for example, by the control terminal 111.

In this way, the queue selection control circuit 610 that indicates the distribution destination of the packets to the selector 620 according to a given distribution condition corresponding to the grain size of QoS can change the condition for distribution to the queues so as to change the number of active queues, and to distribute the packets to the active queues.

Second Embodiment

Figure 9:
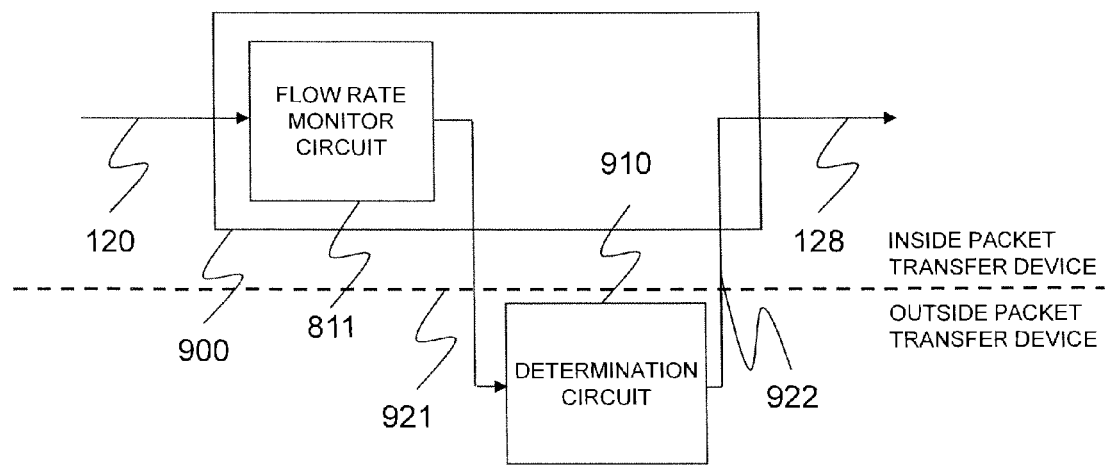
FIG. 9 is a diagram illustrating a configuration of a controller having the determination circuit disposed outside the device.

In a second embodiment of the present invention, the dynamic control of the QoS circuit in which the determination circuit is disposed outside the packet transfer device will be described with reference to FIG. 9. A controller 900 changes the determination circuit 812 of the flow rate monitor and determination circuit 110 in the device of the first embodiment to be disposed outside the device. The other circuits and configurations of the packet transfer device are identical with those in the first embodiment. A determination circuit 910 disposed outside the device receives information from the flow rate monitor circuit 811 within the device, and controls the packet priority determination circuit 102, the packet distribution circuit 104, the queue 106, and the read control circuit 108 according to the condition. An interface 921 from the flow rate monitor circuit 811 to the determination circuit 910 transmits information on the traffic volume per unit time. For example, the interface 921 may transmit sFlow information and NetFlow information. On the other hand, an interface 922 from the determination circuit 910 to the device transmits an instruction for implementing the power saving by the aid of structure definition information. For example, the interface 922 may transmit the instruction as MIB information in an SNMP protocol. The determination circuit 910 may be realized by a server. In this case, if there is a difficulty in rapidly reacting with a change in the flow rate because the determination circuit 910 is disposed outside the device, a method is also effective in which the determination circuit 910 is provided with a statistical function, and the dynamic control is conducted on the basis of statistical information. For example, there is proposed a method in which the flow rate in one day is aggregated as statistic, and control for each time is changed to the power saving operation mode corresponding to the aggregated information.

Further, there is proposed a configuration in which the determination circuit 910 is further provided with a scheduler function in addition to the statistical function. The determination circuit 910 obtains the statistic by the statistical function according to traffic volume information detected by the flow rate monitor circuit 811 of the packet transfer device, and provides the statistic to a network provider. The network provider who has viewed the statistic sets a scheduler setting command in the determination circuit 910. The determination circuit 910 includes a condition information holder and a clock timer, and issues a change instruction to the interface 922 on the basis of a condition in the condition information holder and a clock condition. An example of the scheduler setting command is illustrated in FIG. 10. There are conceivable a variety of setting units of the scheduler. For example, there are conceivable specific day+specific time, specific day, specific day of the week+specific time, specific day of the week, or specific time (every day).

Also, FIG. 13 illustrates the setting describing the assignment of the queues to the respective priorities, and whether to stop the power supply to the unassigned queues, or not, in addition to the setting related to the scheduling in FIG. 10. In FIG. 13, the load states as the condition in FIG. 12 are replaced with scheduling conditions such as day and hour, or the day of the week. Further, like FIG. 12, in FIG. 13, there is a need to designate the QoS circuit to be controlled. Such setting information can be set in the controller 900, for example, from the determination circuit 910 (external device).

For example, the determination circuit 910 outside the packet transfer device obtains the statistical information from the received information on the flow rate for display, receives schedule information including time information and mode information used at the time, and transmits the schedule information to the packet transfer device as the determination information. The packet transfer device changes the grain size of the QoS control according to the time information and the mode information, and controls whether to supply the power to the QoS control circuit or a part of the QoS control circuit, or not.

Also, in the configuration in which the statistic information or the scheduler is used in the above determination circuit, the determination circuit can be installed inside the packet transfer device.

The present invention can be applied to the packet transfer device such as the router or the switch.

What is claimed is:

1. A packet transfer device comprising:
a receiver configured to receive packets;
a transmitter configured to transmit the packets; and
a switch circuit configured to transfer the packets received by the receiver to the transmitter, wherein
one or more of the receiver, the switch circuit, and the transmitter include a QoS control circuit configured to apply QoS control to received packets, and
wherein the QoS control circuit is configured to operate in a power saving operation mode that enables power saving operation by changing a grain size of the QoS control according to a flow rate of the packets, and controlling whether or not to supply an electric power to the QoS control circuit or a part of the QoS control circuit, according to the flow rate of the packets,
wherein the QoS control circuit is a bandwidth control circuit
wherein the QoS control circuit includes:
a plurality of queues that store input packets therein;
a controller configured to monitor the flow rate of the input packets and control power supply to the respective queues; and
a packet distribution circuit configured to distribute the input packets to power supplied active queues according to a priority of a packet and a given distribution condition corresponding to the grain size of QoS control,
the given distribution condition indicating a queue for distribution of an inputted packet corresponding to a priority of the inputted packet and determination information for determining whether or not the packet transfer device operates in the power saving operation mode is held in the packet transfer device; and
in the power saving operation mode, the number of active queues is limited according to the flow rate of the packets, and the power supply to inactive queues stops,
wherein the packet distribution circuit includes:
a selector that changes over a distribution destination of the packets to any one of the plurality of queues according to an input instruction; and
a queue selection control circuit that is configured to instruct the distribution destination of the packets to the selector,
wherein, when only one of the plurality of queues is active, the distribution destination of the packets by the selector is fixed to an active queue, and the power supply to the queue selection control circuit stops.

2. The packet transfer device according to claim 1, wherein
the controller includes a flow rate monitor circuit and a determination circuit.

3. The packet transfer device according to claim 2, wherein the flow rate monitor circuit is configured to monitor the flow rate of the packets to be processed by the QoS control circuit, and the determination circuit is configured to compare a monitor result with a predetermined threshold value to determine whether or not to change over an operation mode to the power saving operation mode.

4. The packet transfer device according to claim 1, wherein the queue selection control circuit is configured to instruct the distribution destination queue of the packets to the selector according to the given distribution condition corresponding to the grain size of QoS control, and the queue selection control circuit is configured to change the number of active queues and change the distribution condition to the queues so as to distribute the packets to the active queues.

5. The packet transfer device according to claim 1, wherein the bandwidth control circuit further includes a priority determination circuit configured to determine a transfer priority of the packets, and in the power saving operation mode, the priority determination circuit is configured to render a circuit for determining a priority inactive, and output the packets to the packet distribution circuit without determining the priority of the input packets.

6. The packet transfer device according to claim 1, wherein the QoS control circuit is configured to monitor a bandwidth, and in the power saving operation mode, the packets pass through a route that bypasses a processing of the bandwidth monitoring.

7. The packet transfer device according to claim 1, wherein the QoS control circuit is the buffer and switch circuit configured to configure the switch circuit, and control the power supply to at least queues or a buffer within the buffer and switch circuit.

8. The packet transfer device according to claim 1, wherein when the flow rate of the packets exceeds a given amount, the grain size of the QoS control is made coarse, and power supply to the QoS control circuit or the part of the QoS control circuit stops to deactivate the QoS control circuit or the part of the QoS control circuit, and when the flow rate of the packets falls below the given amount, the grain size of the QoS control is made fine, and the power supply to the QoS control circuit or the part of the QoS control circuit restarts to activate the QoS control circuit or the part of the QoS control circuit.

9. The packet transfer device according to claim 1, further comprising:

a power supply range control unit configured to limit power supply to an operating range within the QoS control circuit.

10. The packet transfer device according to claim 1, wherein the packet transfer device further comprises an interface for setting the determination information from an external device.

11. The packet transfer device according to claim 1, wherein the QoS control circuit includes a plurality of queues in which the input packets are stored, and the number of queues to be used according to the flow rate of the packets and/or identification information of the queues can be set according to determination information from an external device.

12. A power supply control method for QoS control circuit including a plurality of queues that store input packets therein;

the method comprising the steps of:

distributing input packets to an active queue:

monitoring a flow rate of packets to be input to the QoS control circuit within a packet transfer device, and transmitting information on the flow rate to a determination circuit outside the packet transfer device;

transmitting determination information, which has been determined in the determination circuit whether or not to change over the QoS control circuit to a power saving operation mode according to the information on the flow rate, to the QoS control circuit within the packet transfer device;

changing a grain size of a QoS control according to the determination information and a given distribution condition corresponding to the grain size of QoS control, the given distribution condition indicating a queue for distribution of a inputted packet corresponding to a priority of the inputted packet; and controlling whether or not to supply the power to the QoS control circuit or a part of the QoS control circuit according to the determination information in the packet transfer device and the given distributing condition, wherein the number of queue is limited according to the flow rate of the packets, and the power supply to inactive queues stops.

13. The power supply control method according to claim 12, wherein the determination circuit outside the packet transfer device obtains and displays statistic information according to information of the received flow rate, receives schedule information including time information and mode information used in the time, and transmits the schedule information to the packet transfer device as the determination information, and the packet transfer device changes the grain size of the QoS control according to the time information and the mode information to control whether or not to supply the power to the QoS control circuit or the part of the QoS control circuit.

* * * * *